United States Patent [19]

Grannen, III

[11] Patent Number: 4,732,726

[45] Date of Patent: Mar. 22, 1988

[54] INJECTION MOLD WITH INSERT TRANSFER MEANS AND METHOD

[75] Inventor: Walter A. Grannen, III, Bargersville, Ind.

[73] Assignee: E. W. Mold & Tool Co., Inc., Indianapolis, Ind.

[21] Appl. No.: 908,800

[22] Filed: Sep. 18, 1986

[51] Int. Cl.⁴ ............................................. B29C 65/18
[52] U.S. Cl. ............................... 264/272.21; 264/278; 264/334; 425/553; 425/556; 425/577; 425/588
[58] Field of Search .................. 264/272.21, 274, 278, 264/334; 425/110, 117, 126 R, 126 S, 127, 129 R, 553, 554, 556, 572, 577, 581, 588

[56] References Cited

U.S. PATENT DOCUMENTS

| | | | |
|---|---|---|---|
| 3,481,002 | 12/1969 | Dreps | 425/577 |
| 3,503,095 | 3/1970 | Uhlig | 425/577 X |
| 4,531,702 | 7/1985 | Plummer | 425/577 X |

FOREIGN PATENT DOCUMENTS 0094442 6/1983 Japan .................................. 425/554

*Primary Examiner*—Charles Hart
*Attorney, Agent, or Firm*—Woodard, Emhardt, Naughton, Moriarty & McNett

[57] ABSTRACT

A plastic injection mold having means therein for holding an insert to be secured in the formed product. A pair of complimentary sized mold sections are movable together, one mold section having a pin fixedly mounted thereto and extending toward a second pin slidably mounted in the second mold section and aligned with the first pin. In the preferred embodiment, a helical spring contacting the slidable pin urges the pin outwardly to initially hold an insert. As the mold closes, the pins are contacted together with the spring being yieldable to allow retraction of one pin and the transfer of the insert mounted thereon onto the second pin. In an alternate embodiment, the retractable pin is fixedly mounted to a movable plate having a spring loaded leg depending therefrom with the leg being contactable by the mold sections as the mold is closed for the retraction of the slidable pin and the transfer of the insert.

19 Claims, 6 Drawing Figures

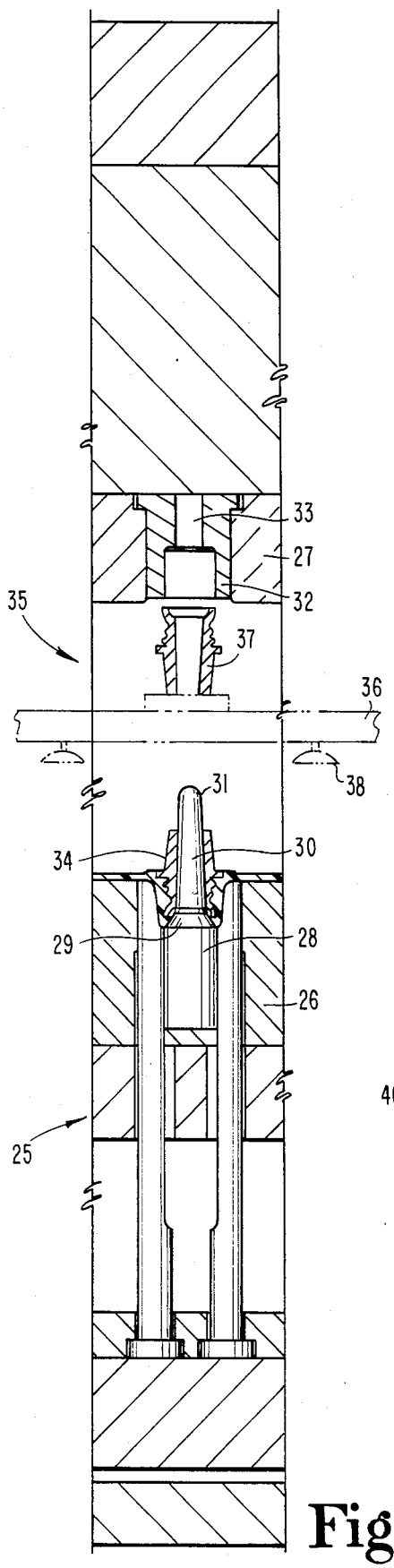
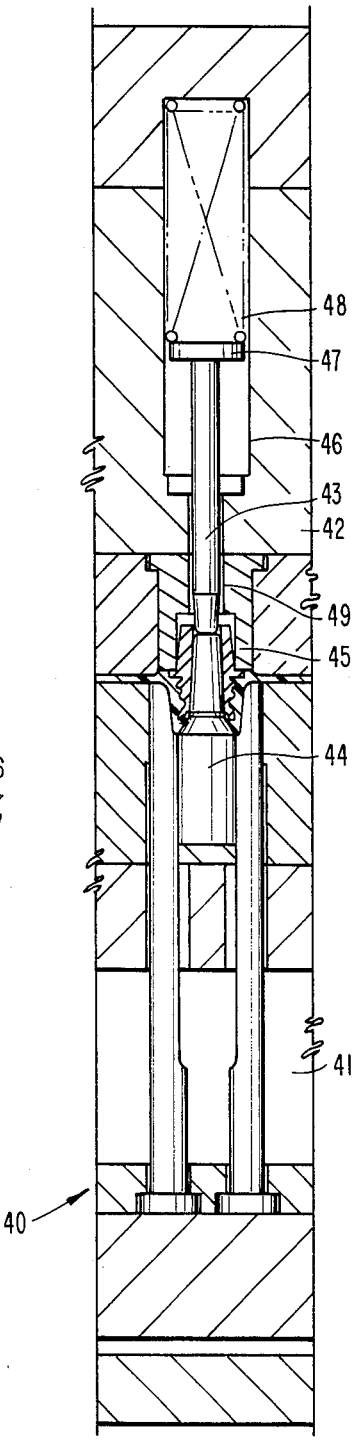
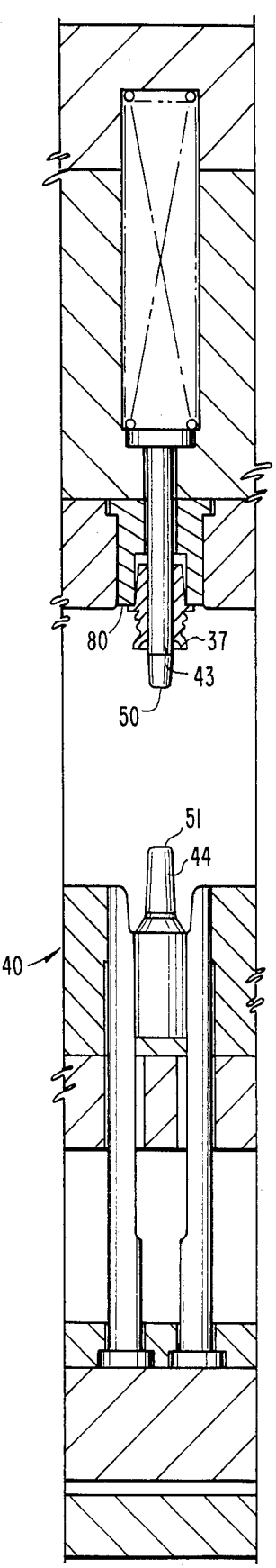
Fig.2 PRIOR ART
Fig.4
Fig.3

INJECTION MOLD WITH INSERT TRANSFER MEANS AND METHOD

BACKGROUND OF THE INVENTION

This invention is in the field of injection molds and more specifically those molds used to produce a plastic product having an insert secured thereto. Many products produced from plastic have metallic inserts molded therein. For example, the lids of battery cases may be produced from plastic with the lead terminal post being rigidly secured to the main body of the lid. It is the practice to produce such battery lids with an injection mold which must be reloaded with a new lead terminal post prior to the injection and formation of each new lid. The injection molds include two half sections with one section having male pins extending outwardly therefrom, upon which the lead terminal posts are mounted prior to injection and formation of the lid. Once the mold is opened, a robot arm is extended into the mold and attaches to the finished lid which is resting upon the half mold section having the male pins extending outwardly therefrom. The robot arm carries the completed lid away from the half mold section, rotates 180° and then moves back onto the same half mold section to mount new lead terminal posts onto the outwardly extending pins. The 180° rotation of the robot arm about its longitudinal axis is necessitated by the location of the lead terminal posts which are carried on the side of the robot arm opposite of the side attached to the lid. It can be appreciated that such a rotation adds to the complexity of the robot arm, as well as increases the cycle time to produce a lid. Disclosed herein is a mold and method which eliminates the need to rotate the robot arm by initially mounting the lead terminal post to the half mold section opposite of the half mold section holding the injected and finished lid. Thus, the robot arm is extended into the mold and moves laterally to lift the completed lid from one half mold section while then moving laterally across to the opposite half mold section, reloading the lead terminal posts thereon. Upon withdrawal of the robot arm and subsequent closing of the mold, the lead terminal posts are transferred between the two half mold sections.

SUMMARY OF THE INVENTION

One embodiment of the present invention is a mold for forming a product having an insert comprising a first mold section and a first pin cantileveredly mounted to the first mold section and extending therefrom. A second mold section is mounted with the first mold section to cooperatively close from an open position to a closed position and is matable with the first mold section when in the closed position together creating a cavity therebetween forming the product. The second mold section having a hole aligned with the first pin when the first mold section and the second mold section are in the closed position. The second pin is movably mounted to the second mold section and aligned with the first pin with the second pin extending out of the hole when the first mold section and the second mold section are apart to initially hold an insert on the second pin and to then retract in the hole allowing the first pin to be positioned closer to the hole when the first mold section and the second mold section are closed together transferring the insert from the second pin to the first pin.

Another embodiment of the present invention is a method of producing products having inserts with a mold having a first mold section and a mating second mold section comprising the steps of mounting an insert within the mold and closing the mold by moving the first mold section and the second mold section together, forming a product within the mold, then opening the mold and extending a robot arm having an insert thereon into the mold, moving the robot arm in a first direction against the first mold section to secure the product to the robot arm, moving the robot arm laterally away from the first mold section in a direction opposite of the first direction carrying the product away therefrom toward the second mold section to reload the mold with another insert by moving the insert against and mounting the insert onto the second mold section, removing the robot arm from the mold while carrying the product, and closing the mold to form another product.

It is an object of the present invention to provide a new and improved mold and method for forming a product having an insert secured thereto.

Another object of the present invention is to provide an injection mold having improved insert holding means.

In addition, it is an object of the present invention to provide means for reloading a mold with inserts to be secured to the formed product in a new and improved manner.

Related objects and advantages of the present invention will be apparent from the following description.

BRIEF DESCRIPTION OF THE DRAWINGS

FIG. 2 is a fragmentary cross-sectional view of the prior art injection mold used to produce the lid of FIG. 1.

FIG. 3 is a fragmentary cross-sectional view of the preferred embodiment of the injection mold incorporated in the present invention, which is utilized to produce the battery lid of FIG. 1.

FIG. 4 is the same view as FIG. 3 only showing the new mold in the closed position.

DESCRIPTION OF THE PREFERRED EMBODIMENTS

Figure 1:
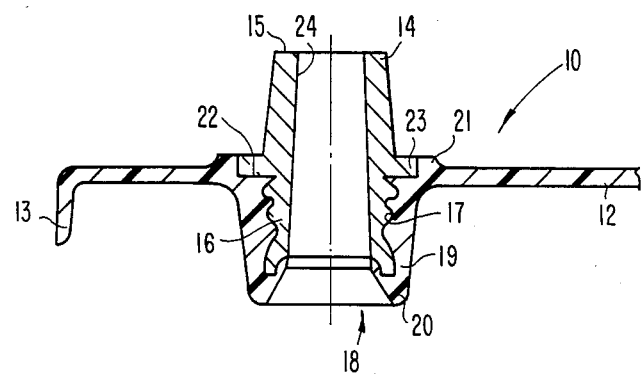
FIG. 1 is a fragmentary cross-sectional view of a plastic battery lid having a metal terminal post secured thereto.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a fragmentary cross-sectional view of a conventional battery lid 10 having a plastic injection formed main body with a horizontally extending top wall 12 integrally attached to a circumferentially extending and downwardly turned edge portion 13 secured to the battery container. Top wall 12 includes a pair of upwardly extending lead terminal posts with one such terminal post 14 depicted in the drawing. Post 14 has a distal end 15 projecting above the battery lid and a proximal end 16 with an outer serrated surface 17 upon which the molten plastic adheres.

A cylindrically shaped plastic boss 19 extends beneath wall 12. The bottom end 20 of boss 19 is positioned below the bottom edge of terminal post 14 whereas the top end 21 of the boss is indented, forming a ledge 22 upon which flange 23 of terminal post rests. The interior cylindrical continuous surface 24 of post 14 forming hole 18 is defined by a linearly increasing radius having a minimum radius adjacent end 15 and a maximum radius at end 20. Likewise, the outside surface of terminal post 14 increases in diameter from end 15 to flange 23.

The prior art injection mold utilized to produce the lid of FIG. 1 is depicted in FIG. 2. Injection mold 25 includes a first half mold section 26 and a second half mold section 27 which are constructed in a conventional manner to open and close. Only a fragment of mold 25 has been shown, since such molds are conventional in the industry. Mold section 26 includes a pair of pins, with one such pin 28 shown fixedly mounted thereto, having a conically shaped base 29 and a cylindrical tapered main body 30 which decreases in diameter from base 29 to the distal end of the pin. Mold section 26 includes a flared recess which extends continuously around conical base 29 and pin 30, diverging outwardly facilitating removal of the plastic formed therein. Aligned across from pin 31 is a bushing 32 fixedly mounted to mold section 27. Bushing 32 includes a cylindrical hole 33 through which pin 30 projects when mold sections 26 and 27 are moved to the closed position. The two mold sections are spaced apart in the closed position a sufficient distance to form the lid 10 therebetween once the plastic is injected into the mold. Pin 30 is utilized to hold the lead terminal post or insert 34 during the injection of the plastic, thereby producing the lid with terminal post as shown in FIG. 1.

Mold 25 is used in a high-production environment with rapid cycles of opening and closing of the mold to produce a great number of lids in a short period of time. Upon the opening of the mold as shown in FIG. 2, the terminal post 34 must be reloaded onto pin 30 prior to the closing of the mold and injection of the plastic for the production of the next lid. Prior to reloading terminal post 34, the lid produced from the prior cycle which is adhering to mold section 26 must first be removed. Thus, once the prior lid is ejected, insert 34 must be installed by hand or by means of a robot arm onto pin 30. It is the practice to extend a robot arm into spacing 35 upon the opening of the mold. The robot arm 36 having removably mounted thereon a new insert 37 is moved into spacing 35 with the arm then utilzing suction cups 38 or other means to lift off the previously produced lid from mold section 26. Robot arm 36 then rotates about its longitudinal axis and moves against pin 31 to position insert 37 thereon. The robot arm is then moved from spacing 35, the mold closes, plastic is injected and a new lid is thereby formed.

Figure 5:
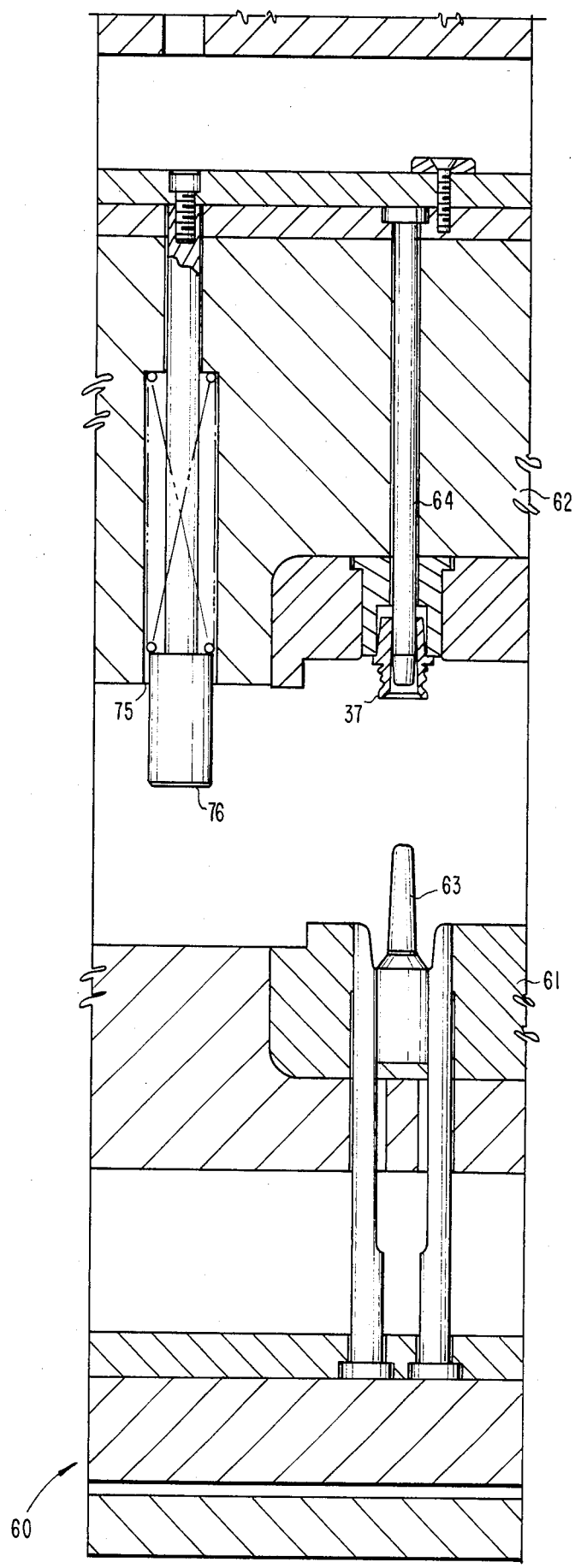
FIG. 5 is a fragmentary cross-sectional view of an alternate embodiment of an injection mold incorporating the present invention.
Figure 6:
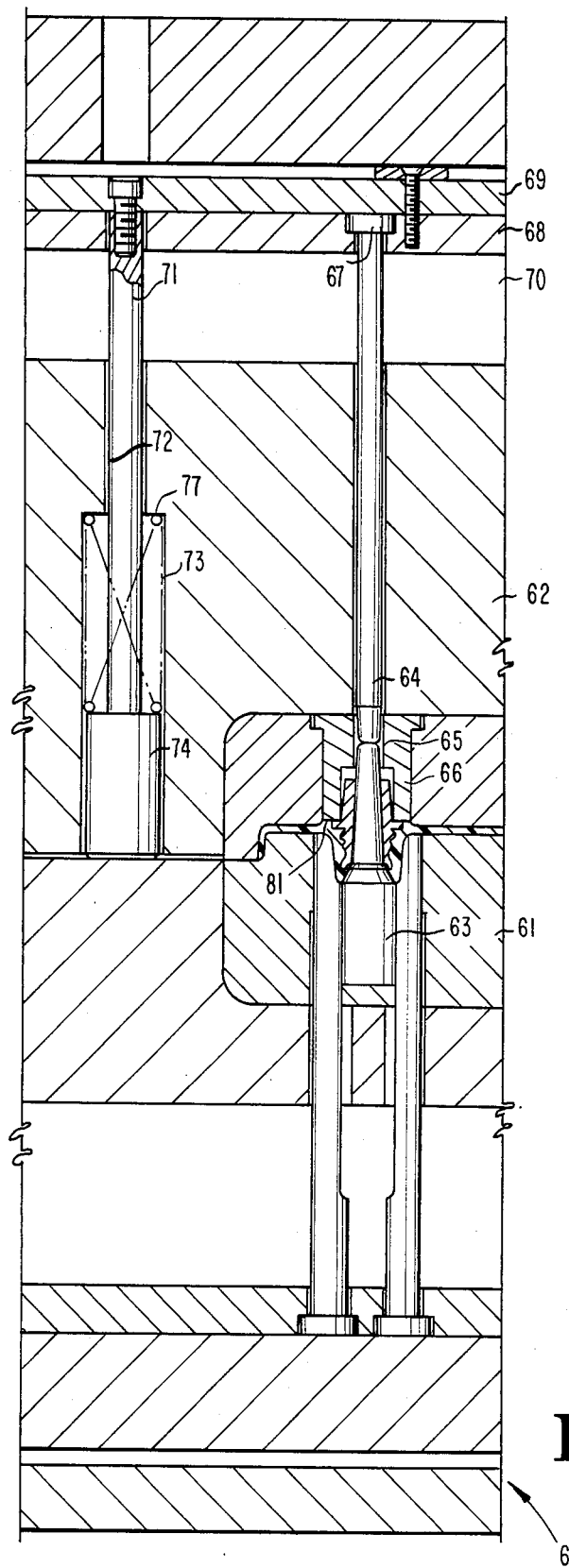
FIG. 6 is the same view as FIG. 5 only showing the alternate mold in the closed position.

A preferred embodiment, FIGS. 3 and 4, and alternate embodiment, FIGS. 5 and 6, each utilize means to reload the terminal posts onto the mold section pin alleviating the necessity of the rotation of arm 36. Each mold has been shown in cross section and in fragment since the remaining portion of the mold may be produced from conventional techniques.

Mold 40 (FIGS. 3 and 4) is identical to mold 25 with the exception that mold section 42 includes a spring loaded pin 43 slidably mounted thereto and which is positioned across from and aligned with pin 44 fixedly secured to mold section 41. Pin 44 and bushing 45 are identical to pin 30 and bushing 32. Mold section 42 includes a cavity 46 slidably housing the cylindrical main body of pin 43 which has a flat base integrally attached thereto. A helical spring 48 is captive within cavity 46 contacting enlarged end 47 of pin 43 and is operable to normally urge the outer end of pin 43 toward pin 44 but is yieldable to allow retraction of pin 43 through hole 49 of bushing 45 once the mold is closed and pin 44 contacts pin 43 transferring insert 37 from pin 43 to pin 44. The outer distal ends 50 and 51 of pins 43 and 44 are flat and are contactable together, whereas pin 31 has a rounded distal end.

Mold 60 (FIGS. 5 and 6) is identical to mold 40 with the exception of the means utilized to move the retractable pin. Thus, pin 63 is fixedly mounted to mold section 61, whereas retractable pin 64 is slidably mounted to mold section 62 and is slidable through an aperture 65 extending through bushing 66 with pin 64 being aligned across from pin 63. Both pins have distal ends with flat surfaces identical to flat surfaces 50 and 51. The proximal end 67 of pin 64 is held captive and fixedly mounted to plate 68 in turn fixedly secured to plate 69. Plates 68 and 69 are movable within cavity 70 and are fixedly secured to leg 71 extending through passage 72 provided in mold section 62. Passage 72 is enlarged housing a helical spring 73. The distal end 74 of leg 71 is also enlarged and is extendable outwardly through aperture 75 of mold section 62, having a contact surface 76 contactable against mold section 61 as the mold closes. One end of a helical spring contacts proximal end 74 of leg 71, whereas the opposite end of the helical spring contacts stop surface 77 of the enlarged portion of passage 73. Thus, the helical spring is operable to urge proximal end 74 downwardly toward mold section 61, thereby forcing plates 68 and 69 to likewise move retractable pin 64 toward pin 63. As the mold closes, mold section 61 contacts surface 76 as pin 63 enters insert 37 with leg 71 being moved upwardly thereby retracting pin 64 into bushing 66 and transferring insert 37 from pin 64 to pin 63.

FIGS. 3 and 5 show, respectively, the open position of molds 40 and 60, whereas FIGS. 4 and 6 show both molds in the closed position. The method of producing a plastic injected product having an insert therein includes the steps of mounting insert 37 onto pins 43 and 64 with the mold then being closed contacting pin 43 with pin 44 and pin 64 with pin 63. As pins 43 and 64 retract, surfaces 80 and 81 of bushings 45 and 66 contact the outwardly extending flange 23 of the insert thereby holding the insert as the mold closes, allowing pins 44 and 63 to extend into the insert. Pins 43 and 64 each have a constant diameter except for the distal tips thereof whereas fixed pins 44 and 63 have an increasing diameter from their distal ends to their proximal ends. Thus, insert 37 will become wedged onto the fixed pins 44 and 63 thereby securing the insert on the pins as the mold is closed and the plastic is injected into the mold forming the finished product. The mold is then subsequently opened and the injected product with insert is removed while a new insert is reloaded onto pins 43 and 64. The inserts may be reloaded manually onto the retractable pins or may be installed thereon by means of the robot arm 36. In the event robot arm 36 is utilized, then the robot arm is first moved laterally toward pins 44 and 63 until suction cups 38 engage and hold the completed product. The robot arm is then moved laterally away from mold sections 41 and 61 toward the outwardly extending pins 43 and 64. The robot arm is moved sufficiently close to the retractable pins to install or reload a new insert 37 onto the retractable pins. Thus, the robot arm moves laterally from one mold section to the complimentary mold section without the necessity of rotation about the longitudinal axis of the robot arm as is required with the prior art mold shown in FIG. 2. Once the robot arm lifts the completed lid off of mold sections 41 and 61 and subsequently reloads the inserts onto the retractable pins, the robot arm is retracted from the mold carrying the completed lid therefrom allowing for the start of a new cycle.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A mold for forming a product having an insert comprising:

a first mold section;

a first pin cantileveredly mounted to said first mold section and extending therefrom;

a second mold section mounted with said first mold section to cooperatively close from an open position to a closed position and matable with said first mold section when in said closed position together creating a cavity therebetween forming said product, said second mold section having a hole aligned with said first pin when said first mold section and said second mold section are in said closed position;

a second pin movably mounted to said second mold section and aligned with said first pin with said second pin extending out of said hole when said first mold section and said second mold section are apart to initially hold an insert on said second pin and to then retract in said hole allowing said first pin to be positioned closer to said hole when said first mold section and said second mold section are closed together transferring said insert from said second pin to said first pin; wherein, said first pin includes a tapered main body with a first proximal end fixedly mounted to said first mold section and a first distal end, said tapered main body decreases in cross-sectional size from said proximal end to said distal end; and said second pin is slidably mounted to said second mold section and is positioned in said hole, said second pin includes a second distal end contactable against said first distal end as said first mold section and said second mold section are closed together sliding said second pin into said hole transferring said insert on said second pin onto said first pin.

2. The mold of claim 1 wherein:

said first mold section includes a post forming surface surrounding said first pin and diverging in a direction from said first proximal end apart from said first pin forming a flared recess which cooperatively with said tapered main body allows a post formed therein to be removed from said recess and off said first pin.

3. The mold of claim 2 wherein:

said first distal end and said second distal end have flat ends contactable together when said mold is closed.

4. The mold of claim 2 and further comprising:

rectractable means mounted to said second mold section and associated with said second pin operable to retract said second pin into said hole as said first mold section and second mold section are closed together.

5. The mold of claim 4 wherein:

said retractable means includes spring means mounted to said second mold section operable to normally urge said second pin outwardly but yieldable to allow said second pin to retract when contacted by said first pin.

6. The mold of claim 4 wherein:

said retractable means includes a member movable mounted to said second mold section and further includes a leg with said second pin and leg attached to said member, said leg extends toward said first mold section and is contactable by said first mold section as said mold closes moving said member with said second pin away from said first mold section retracting said second pin into said hole.

7. An injection mold for forming a plastic product having an insert comprising:

a first mold section;

first means mounted to said first mold section;

a second mold section mounted with said first mold section to cooperatively close from an open position to a closed position and matable with said first mold section when in said closed position together creating a cavity therebetween forming said product, said second mold section having receiving means aligned with said first means when said first mold section and said second mold section are in said closed position;

second means mounted to said second mold section and aligned with said first means with said second means positioned by said receiving means when said first mold section and said second mold section are apart to initially hold an insert on said second means and operable to allow said first means to be positioned closer to said receiving means when said first mold section and said second mold section are closed together and to transfer said insert from said second means to said first means; wherein, said first means includes a first pin with a tapered main body with a first proximal end fixedly mounted to said first mold section and a first distal end, said tapered main body decreases in cross-sectional size from said proximal end to said distal end; and said second means includes a second pin slidably mounted to said second mold section and is positioned in said receiving means, said second pin includes a second distal end contactable against said first distal end as said first mold section and said second mold section are closed together sliding said second pin into said receiving means transferring said insert on said second pin onto said first pin.

8. The mold of claim 7 wherein:

said first mold section includes a post forming surface surrounding said first pin and diverging in a direction from said first proximal end apart from said first pin forming a flared recess which cooperatively with said tapered main body allows a post formed therein to be removed from said recess and off said first pin.

9. The mold of claim 7 wherein:
said first distal end and said second distal end each have flat ends contactable together when said mold is closed.

10. The mold of claim 7 and further comprising:
retractable means mounted to said second mold section and associated with said second pin operable to retract said second pin into said receiving means as said first mold section and second mold section are closed together.

11. The mold of claim 10 wherein:
said retractable means includes spring means mounted to said second mold section operable to normally urge said second pin outwardly but yieldable to allow said second pin to retract when contacted by said first pin.

12. The mold of claim 10 wherein:
said retractable means includes a member movable mounted to said second mold section, said retractable means further includes a leg with said second pin and leg attached to said member, said leg extends toward said first mold section and is contactable by said first mold section as said mold closes moving said member with said second pin away from said first mold section retracting said second pin into said receiving means.

13. A method of producing products having inserts with a mold having a first mold section and a mating second mold section comprising the steps of:
mounting an insert within said mold;
closing said mold by moving said first mold section and said second mold section together;
forming a product within said mold;
opening said mold:
extending an arm carrying an insert into said mold:
moving said arm in a first direction against said first mold section to secure said product to said arm;
moving said arm laterally away from said first mold section in a direction opposite of said first direction carrying said product away therefrom toward said second mold section to reload said mold with another insert by moving said insert against and mounting said insert onto said second mold section;
removing said arm from said mold while carrying said product; and,
closing said mold to form another product.

14. A method of producing products having inserts with a mold having a first mold section and a mating second mold section comprising the steps of:
mounting an insert within said mold;
closing said mold by moving said first mold section and said second mold section together;
forming a product within said mold;
opening said mold;
extending an arm carrying an insert into said mold;
moving said arm in a first direction against said first mold section to secure said product to said arm;
moving said arm laterally away from said first mold section in a direction opposite of said first direction carrying said product away therefrom toward said second mold section to reload said mold with another insert by moving said insert against and mounting said insert onto said second mold section;
removing said arm from said mold while carrying said product; and,
closing said mold by moving said first mold section and said second mold section together while transferring said insert from said second mold section to said first mold section.

15. The method of claim 14 and further comprising the steps of:
mounting said insert onto a second pin movably mounted to said second mold section;
contacting said second pin with a first pin fixedly mounted to said first mold section as said mold is closed retracting said second pin and transferring said insert on said second pin onto said first pin.

16. A method of producing products having inserts with a mold having a first mold section and a mating second mold section comprising the steps of:
mounting an insert onto said second mold section;
closing said mold by moving together said first mold section and said second mold section while transferring said insert from said second mold section to said first mold section;
forming a product having said insert affixed thereto within said mold:
opening said mold: and,
removing said product with insert from said mold.

17. The method of claim 16 and further comprising the steps of:
extending a robot arm having a new insert thereon into said mold;
moving said robot arm against said first mold section to secure said product to said robot arm;
moving said robot arm laterally away from said first mold section carrying said product away therefrom toward said second mold section to reload said mold with said new insert by moving said new insert against and mounting said new insert onto said second mold section;
removing said robot arm from said mold while carrying said product: and,
closing said mold to form another product.

18. The method of claim 16 and further comprising the step of:
mounting said insert onto second holding means mounted to said second mold section; and,
contacting said second holding means with first holding means mounted to said first mold section as said mold is closed transferring said insert on said second holding means onto said first holding means.

19. A mold for forming a product incorporating a separate insert comprising:
a first mold section;
a first pin cantileveredly mounted to said first mold section and extending therefrom;
a second mold section mounted with said first mold section to cooperatively close from an open position to a closed position and matable with said first mold section when in said closed position together creating a cavity therebetween forming said product, said second mold section having a hole aligned with said first pin when said first mold section and said second mold section are in said closed position; and,
a second pin aligned with said first pin and movably mounted to said second mold section so that said second pin is cyclically movable between a first position extending out of said hole when said first mold section and said second mold section are apart to initially hold said insert on said second pin, and a second position retracted into said hole allowing said first pin to be positioned closer to said hole when said first mold section and said second mold section are closed together thereby transferring said insert from said second pin to said first pin.

* * * * *